US008856918B1

(12) United States Patent
Efstathopoulos et al.

(10) Patent No.: US 8,856,918 B1
(45) Date of Patent: Oct. 7, 2014

(54) HOST VALIDATION MECHANISM FOR PRESERVING INTEGRITY OF PORTABLE STORAGE DATA

(75) Inventors: Petros Efstathopoulos, Los Angeles, CA (US); Bruce Montague, Santa Cruz, CA (US); Dharmesh Shah, San Jose, CA (US); Kevin Butler, State College, PA (US)

(73) Assignee: Symantec Corporation, Mountain View, CA (US)

( * ) Notice: Subject to any disclaimer, the term of this patent is extended or adjusted under 35 U.S.C. 154(b) by 991 days.

(21) Appl. No.: 12/683,852

(22) Filed: Jan. 7, 2010

(51) Int. Cl.
*G06F 21/00* (2013.01)
*G06F 21/31* (2013.01)

(52) U.S. Cl.
CPC ..................................... *G06F 21/31* (2013.01)
USPC .................................. 726/19; 726/9; 713/184

(58) Field of Classification Search
CPC ...... H04L 63/853; G06F 21/31; G06K 19/07; H04W 12/06
USPC ......................... 726/9, 19; 729/9, 19; 713/184
See application file for complete search history.

(56) References Cited

U.S. PATENT DOCUMENTS

| 6,484,173 | B1 * | 11/2002 | O'Hare et al. ........................ 1/1 |
| 2007/0083939 | A1 * | 4/2007 | Fruhauf et al. .................. 726/34 |
| 2007/0239990 | A1 * | 10/2007 | Fruhauf et al. ................ 713/185 |
| 2008/0005426 | A1 * | 1/2008 | Bacastow et al. ............... 710/62 |

OTHER PUBLICATIONS

Kevin R.B. Butler et al., "U Can't Touch This: Block-Level Protection for Portable Storage," Systems and Internet Infrastructure Security Lab, Pennsylvania State University, University Park, PA, USA.
Scott Garriss et al., "Trustworthy and Personalized Computing on Public Kiosks," Jun. 17-20, 2008, MobiSys'08, Breckenridge, Colorado, USA.
John Linwood Griffin et al., "On the feasibility of intrusion detection inside workstation disks," Dec. 2003, Parallel Data Laboratory, Carnegie Mellon University, Pittsburgh, PA, USA.
Dennis Hissink, "SanDisk TrustedFlash introduction," Sep. 27, 2005, retrieved from the Internet: URL:http://www.letsgodigital.org/en/news/articles/story_4571.html.
"TrustedFlash Security Technology FAQ's," retrieved from the Internet: URL:http://www.sandisk.com/business-solutions/technology/trustedflas . . . .
"TCG Storage Security Subsystem Class: Opal, Specification Version 1.0, Revision 1.0" Jan. 27, 1999, Trusted Computing Group, Inc.

(Continued)

*Primary Examiner* — Hadi Armouche
*Assistant Examiner* — Dao Ho
(74) *Attorney, Agent, or Firm* — Brill Law Office; Jeffrey Brill

(57) ABSTRACT

A host validation system runs on a portable storage device, and protects data stored thereon from unauthorized access by host computers. The system identifies a host to which the portable device is coupled, for example by using the host's TPM. This can further comprise identifying the host's current configuration. The system uses the identification and configuration information to verify whether the host is approved to access data stored on the portable device. The system provides the host a level of data access responsive to this verification. This can involve denying all data access to the host, or providing at least some access to data stored on the portable device, for example based on a stored access policy specifying levels of access to provide to specific hosts with specific configurations.

18 Claims, 6 Drawing Sheets

(56) References Cited

OTHER PUBLICATIONS

Marius Oiaga, "Windows 7 'Bitlocker to Go' Backward Compatible with XP and Vista," Apr. 24, 2009, Softpedia, retrieved from the Internet: URL:http://www.softpedia.com/news/Windows-7-BitLocker-To-Go-Ba . . . .
"Ironkey Personal S200," Jul. 15, 2009, www.Ironkey.com.
"Ironkey Enterprise S200," Nov. 12, 2009, www.Ironkey.com.
"Ironkey Basic S200," Jul. 15, 2009, www.Ironkey.com.

* cited by examiner

HOST VALIDATION MECHANISM FOR PRESERVING INTEGRITY OF PORTABLE STORAGE DATA

TECHNICAL FIELD

This disclosure pertains generally to computer security, and more specifically to validating host computing devices to protect data on portable storage devices.

BACKGROUND

Portable storage devices are becoming smaller in size and greater in storage capacity, thereby enabling computer users to become increasingly mobile. Today, a user can easily carry multiple gigabytes of data between computing devices on a physically small, capacity dense portable storage device such as a Universal Serial Bus ("USB") memory stick. Such a device conveniently fits in a shirt pocket or on a keychain, and thus can be used, for example, to move data between computing devices the user operates at different physical locations (e.g., a work computer, a home computer, a computer owned by a third party and temporarily accessed by the user, etc.). Some portable storage devices even have onboard processors as well as storage capability.

These developments in storage device technology create significant data protection challenges for organizations (e.g., companies, universities, governmental departments, etc.). Contemporary portable storage devices are commonly equipped with ubiquitous interfaces such as USB, allowing them to be plugged into virtually any computer. Their small size and vast storage capacity provide an invitation for users to take them wherever they go, and thus potentially to plug them into a variety of computers in order to access and work with organization data outside of the controlled workplace environment (e.g., at home, at an Internet cafe while on vacation, etc.). In the controlled computing environment within an organization, an IT administrator or the like can ensure the integrity of the computing devices, and by extension of the enterprise data being processed thereon. In contrast, there are limited or no guarantees about the integrity state of a computing device outside a controlled environment (e.g., the user's home computer). By taking organization data offsite and accessing it from computer systems not internally authenticated by the organization, the organization data is put at risk. Because an external computer system from which the data is being accessed could be infected with malware or otherwise compromised, the organization's data could be stolen, hacked or otherwise misused, without the knowledge of the user. Enforcing an organization's security policy on computers outside of the organizations physical control is a major problem for organizations.

Some existing systems allow the host (i.e., the computing device to which the portable storage device is being connected) to validate the portable storage device. For example, SanDisk Trusted Flash addresses the issue of a host validating a portable storage device, and leverages the Opal specification from the Trusted Computing Group, which provides a framework for hosts to validate portable devices. Similarly, Microsoft BitLocker to Go uses the host to perform validation of the portable storage device. However, these systems do not allow or otherwise consider the portable storage device to be independently capable of performing enforcement functionality concerning the host. In another arena, IronKey is a company that manufactures secure USB flash drives, which can have partitions that are initially inaccessible. To access the secure partitions of these devices, the user provides a credential to the device. However, no functionality for validation of the host is provided. Just authenticating the user without authenticating the host is insufficient, because the host could be compromised without the knowledge of the user.

A mechanism also exists for validating hosts using a mobile phone. However, since the validation is being performed from the mobile phone, a separate means of reliably identifying the specific host in question is required. This is so because the mobile device is not physically connected to the host, and thus one is unsure of which host is being validated without some other, independent mechanism. In addition, the mobile phone validation mechanism requires a virtual machine image to be downloaded from the cloud in order to access data once a host is validated. Thus, this mechanism does not enable identification of which host is being validated, nor does it provide local access to stored data once a given host is validated.

Although authenticating the portable storage device and/or the user can both be useful, neither of these methodologies protects against connecting a portable storage device to a compromised host, which is a risk even where the user and/or the portable storage device are authenticated. Furthermore, because these methods implement security at a host level, the host is always subject to attacks in order to compromise its in-memory security features, such as keys. On the other hand, attempting to validate a host from a mobile phone in order to access data from the cloud does not allow for identification of which host is being validated, nor for access of local data on a portable device.

SUMMARY

A host validation system runs in the computer memory of a portable storage device, and protects data stored thereon from unauthorized access by host computers. When the portable storage device is coupled to a host computer (e.g., through a USB connection), the host validation system identifies the host computer. Note that both a host computer and the portable storage device each contain computer memory. It is to be understood that the host computer and portable storage device are instantiated as two separate devices, each of which contains a separate instance of computer memory. In some embodiments, the host validation system uses the host computer's Trusted Platform Module (e.g., by using the remote attestation feature) to identify the host computer. This can further comprise identifying the host computer's current configuration.

The host validation system verifies whether the identified host computer is approved to access data stored on the portable storage device. To do so, the host validation system can compare an identifier of the host computer to a plurality of stored identifiers of host computers approved for accessing data stored on the portable storage device. In some embodiments, the host validation system determines the current configuration of the host computer responsive to whether the host computer is verified for possible data access. In some embodiments, responsive to determining that the host computer is not currently approved to access data stored on the portable storage device, the host validation system determines the current configuration of the host computer, and in response verifies the host computer for possible data access.

The host validation system provides a level of access to data stored on the portable storage device to the host computer, in response to the results of the above-described verifying step. This can involve denying all data access to the host computer, or providing the host computer with at least some access to data stored on the portable storage device. In some embodiments, the host validation system reads a stored access policy specifying levels of access to provide to specific host computers with specific configurations, and provides an appropriate access level to the coupled host computer based on the stored policy.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
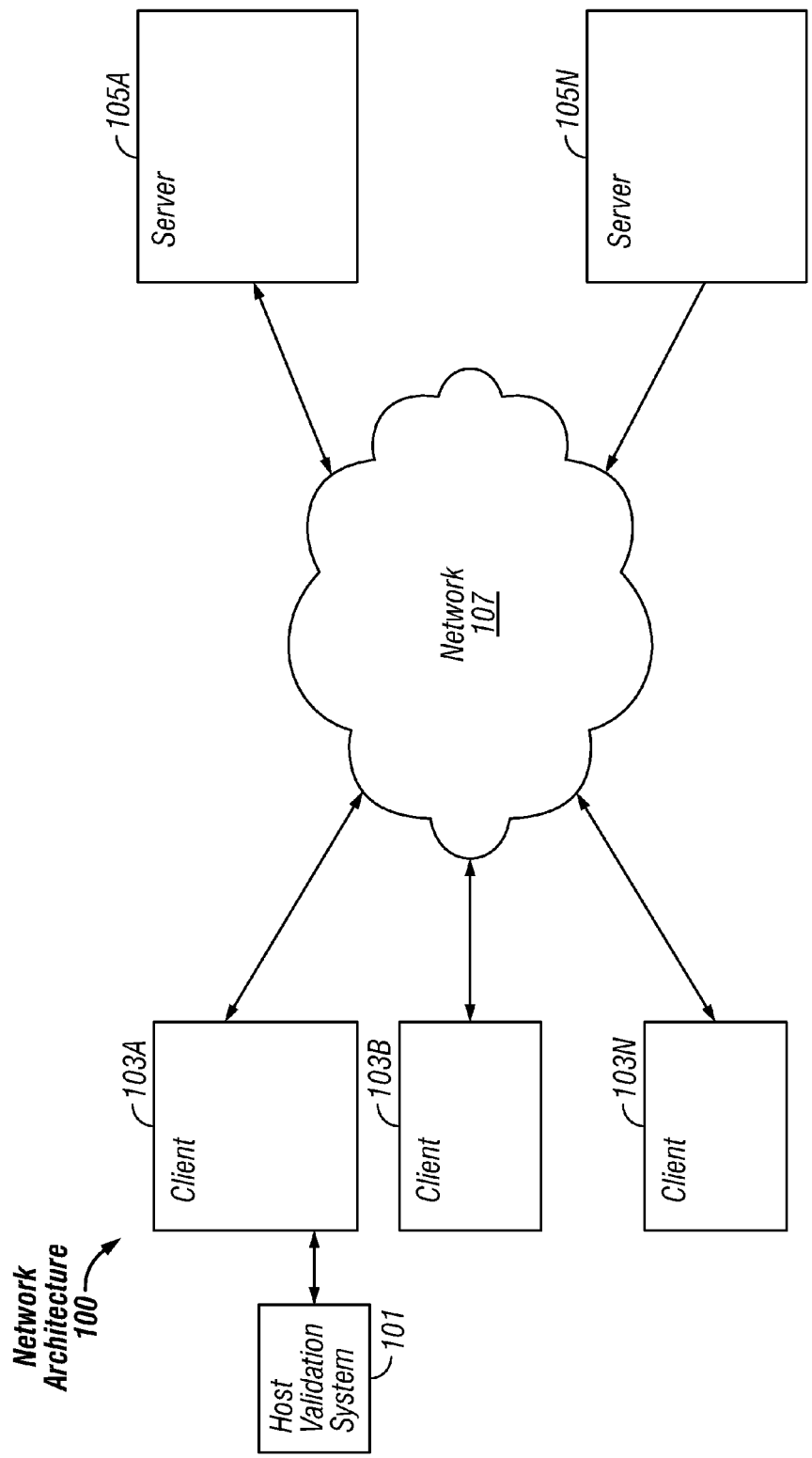
FIG. 1 is a block diagram of an exemplary network architecture in which a host validation system can be deployed, according to some embodiments.

FIG. 1 is a block diagram illustrating an exemplary network architecture 100 in which a host validation system 101 can be deployed and used. The illustrated network architecture 100 comprises multiple clients 103A, 103B and 103N, as well as multiple servers 105A and 105N. In FIG. 1, the host validation system 101 is illustrated as being deployed in conjunction with client 103A. It is to be understood that this is an example only, and in various embodiments various functionalities of this system 101 can be instantiated in conjunction with a client 103, a server 105 or multiple clients 103 and/or servers 105. Clients 103 and servers 105 can be implemented using computer systems 210 such as the one illustrated in FIG. 2 and described below. The use of a host validation system 101 to validate a computer system 210 is described in detail below.

The multiple clients 103 and servers 105 illustrated in FIG. 1 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
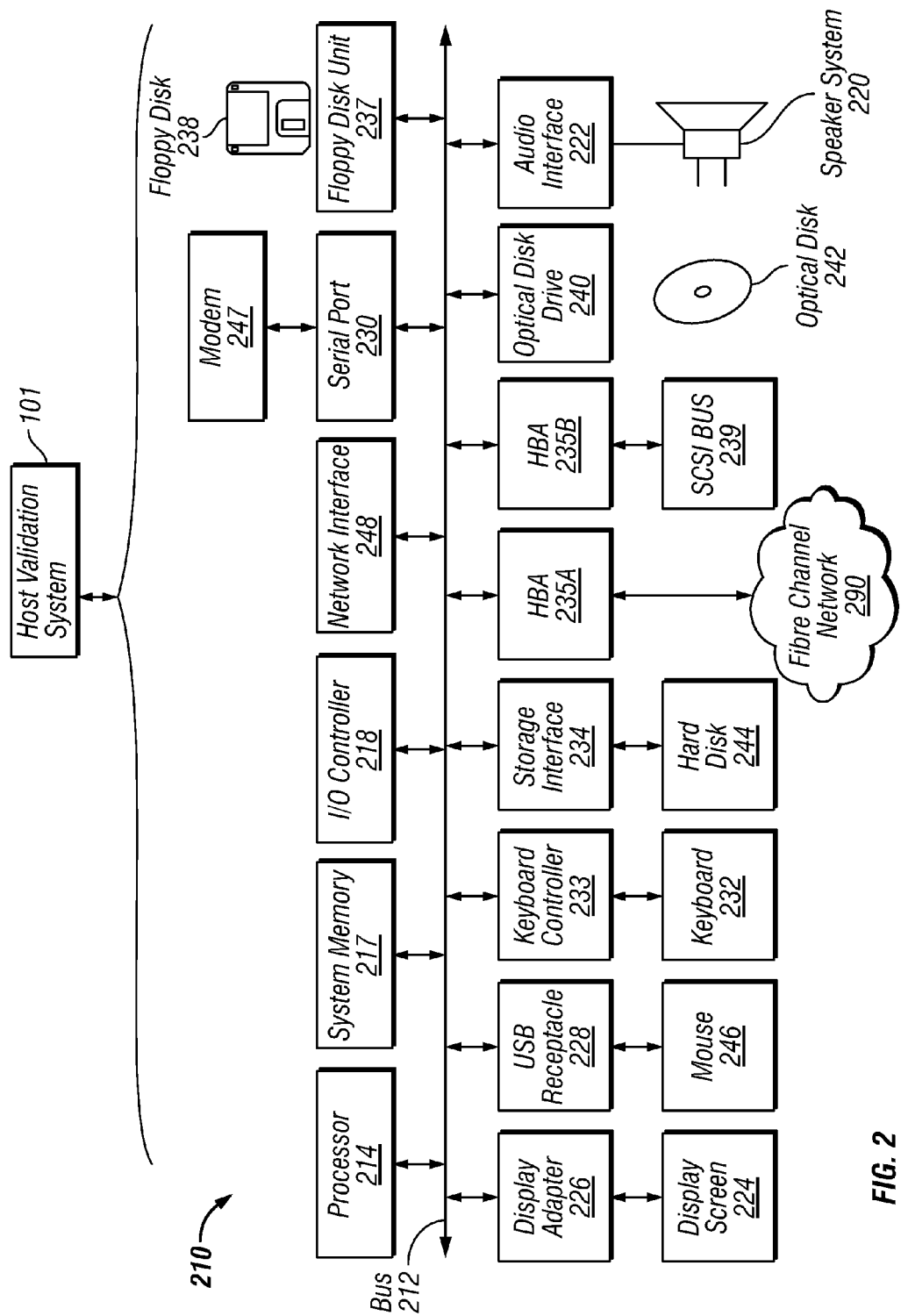
FIG. 2 is a block diagram of computer system suitable for use within a host validation system context, according to some embodiments.

FIG. 2 is a block diagram of a computer system 210 suitable for validation by a host validation system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 228, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, a host validation system 101 is illustrated as being communicatively coupled to the host computer 210. The workings of the host validation system 101 are explained in greater detail below.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet.

Figure 3:
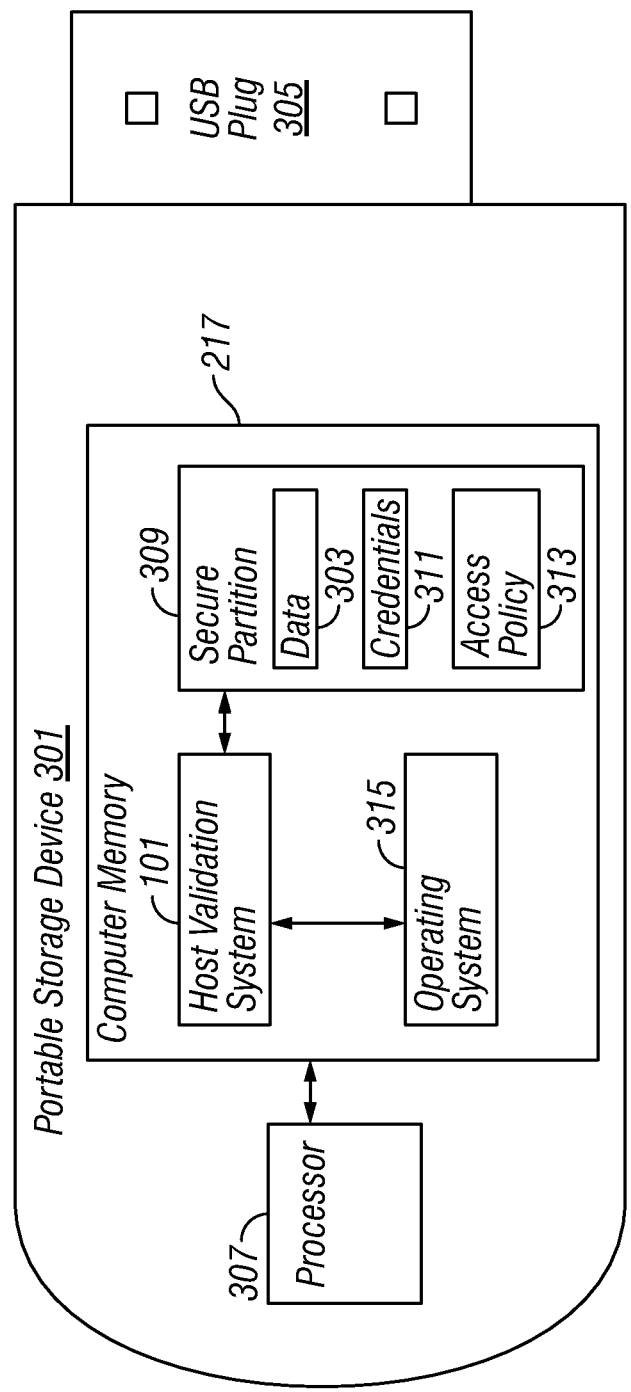
FIG. 3 is a block diagram of a portable storage device for use with a host validation system, according to some embodiments.

FIG. 3 illustrates a portable storage device 301 from which the host validation system 101 validates a host computer 210 to determine whether or not to allow the host computer 210 access to data 303 on the portable storage device 301. The portable storage device 301 is configured such that it can be readily coupled to a computer system 210. For example, in one embodiment the portable storage device 301 is equipped with a USB plug 305 (as illustrated) for physically connecting to a USB receptacle 228 on a computer system 210. In other embodiments, the portable storage device 301 is configured for connecting to other types of ubiquitous interfaces such as a serial port 230, parallel port, USB port, firewire port, fibre-channel port, networked I/O port, etc. The portable storage device 301 can also be readily decoupled from the computer system 210 by disconnecting it from the computer system 210. A computer system 210 to which the portable storage device 301 is communicatively coupled is referred to herein as a "host computer" 210.

The portable storage device 301 contains computer memory 217 in which data 303 can be stored. Note that both the computer 210 illustrated in FIG. 2 and the portable storage device 301 illustrated in FIG. 3 each contain computer memory 217. It is to be understood that the illustrated computer 210 and portable storage device 301 are instantiated as two separate devices, each of which contains a separate instance of computer memory 217. The host validation system 101 also resides in the computer memory 217 of the portable storage device 301. Furthermore, the computer memory 217 of the portable storage device 301 contains identifying credentials 311 of known host computers 210 and an access policy 313, specifying access levels to be provided to different known hosts 210. The computer memory 217 of the portable storage device 301 can comprise secure partitions 309 which cannot be accessed by an outside process or user. In some embodiments, the computer memory 217 of the portable storage device 301 can also comprise one or more unsecure partitions (for instance, a policy could always specify that unknown hosts can access a default unsecure partition). The portable storage device 217 illustrated in FIG. 3 stores data 303, identifying credentials 311 of known host computers 210 and the host access policy 313 in secure partitions 309. Additionally, the portable storage device 301 contains an onboard processor 307, which can be used, for example, to run the host validation system 101. An operating system 315 is also present, such as a version of Linux configured for running on portable storage devices 301. The portable storage device 301 is typically small, such that it can be carried in a pocket or the like when not physically connected to a computer system 210. In one embodiment, the portable storage device 301 is in the form of a USB memory stick.

Figure 4:
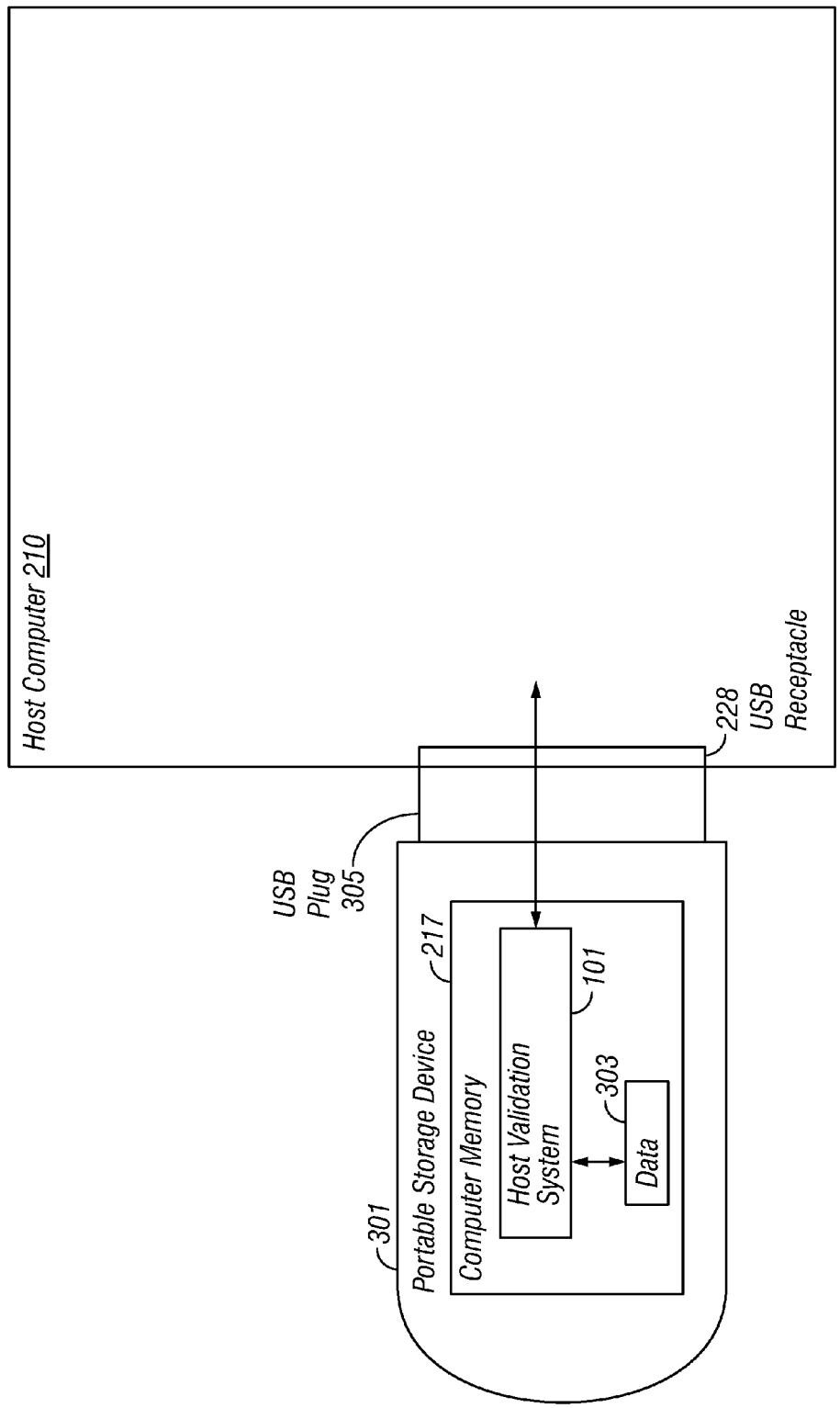
FIG. 4 is a block diagram of a portable storage device coupled to a computer system for use with a host validation system, according to some embodiments.

Turning now to FIG. 4, a portable storage device 301 is illustrated as being coupled to a computer system 210. As illustrated, in this context, the computer system 210 is functioning as a host computer 210 to the portable storage device 101. (For example, suppose the user has coupled the portable storage device 301 to his home computer 210, or to a computer in a hotel business center or an Internet cafe.) From the portable storage device 301, the host validation system 101 validates the integrity of the host computer 210 to which the portable storage device 301 is coupled, before the host validation system 101 allows the host computer 210 access to the data 303 on the portable storage device 301. As described in detail below, in some embodiments the host validation system 101 validates the host computer 210 based on its current state. Only if the host computer 210 is successfully validated does the host validation system 101 allow the host computer 210 to access data 303 stored on the portable storage device 301. This provides a number of advantages compared to conventional systems, in which any security checking is performed by the host computer 210. Because the portable storage device 301 is enforcing its own policy rather than a host level policy, the protection of the stored data 303 is localized to the portable storage device 301 itself. This avoids problems as seen with host based systems (e.g., Microsoft BitLocker), in which security is performed by the host computer 210, leading to potential attacks aimed at the host 210 (e.g., an attempt to find a key in the host's computer memory 217). By contrast, the host validation system 101 does not allow any access to the portable storage device 301 by a computer system 210 that does not present the proper credentials.

Figure 5:
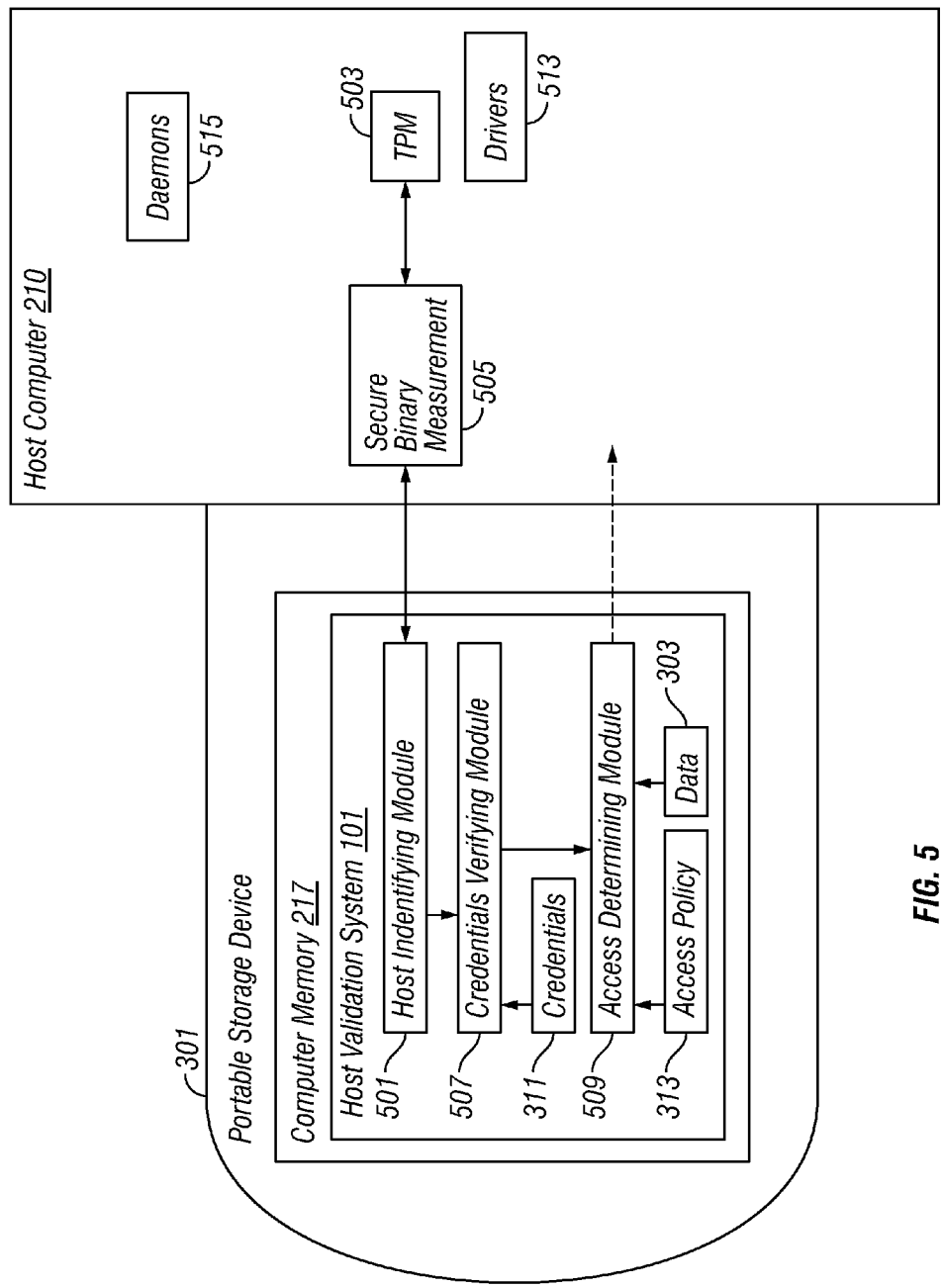
FIG. 5 is a block diagram of the operation of a host validation system, according to some embodiments.

Turning now to FIG. 5, a host validation system 101 is illustrated validating a host computer 210 from a portable storage device 301. It is to be understood that the host validation system 101 represents a collection of functionalities, which can be instantiated as a single module or as multiple modules as desired (an instantiation of specific, multiple modules of the host validation system 101 is illustrated in FIG. 5). It is to be understood that the modules of the host validation system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the host validation system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 5, when the portable storage device 301 is communicatively coupled to the host computer 210, a host identification module 501 of the host validation system 101 communicates with the host computer 210 (e.g., via USB) and identifies the host computer 210, for example by using the host's Trusted Platform Module 503 (TPM). A TPM 503 is a secure crypto-processor chip configured according to a specific, defined standard. TPMs 503 are currently ubiquitously present on commercially available user level computer systems 210. One feature supported by TPM 503 is remote attestation, which allows the computer system 210 on which a TPM 503 is installed (the host computer 210 in this case) to authenticate its hardware/software configuration to a third party (the host validation system 101 on the portable storage device 301, in this case). This enables the host validation system 101 to confirm that the host computer 210 is configured in a trustable manner, and has not been compromised (e.g., by malware). Remote attestation involves the TPM 503 creating an essentially unforgeable, identifying secure binary measurement 505, such as a binary measurement generated by a secure hash function, whose integrity is justified through a cryptographically strong digital signature generated by the TPM 503. This secure binary measurement 505 can be used to uniquely identify the computer system 210 to a third party, and allows the third party to confirm that the configuration is trustworthy, for example by summarizing the hardware/software configuration of the computer system 210 on which the TPM 503 is installed. Remote attestation is usually combined with public-key encryption so that the identifying secure binary measurement 505 can only be read by the third party that requested the attestation, and not by an eavesdropper. The TPM 503 provides a public and private key pair, which is created randomly on the TPM hardware 503 at manufacture time and cannot be changed. The private key never leaves the TPM chip 503, while the public key can be used for attestation and for encryption of sensitive data sent to the TPM 503. It is to be understood that in other embodiments, an identifier other than the above-described identifying secure binary measurement 505 can be used to uniquely identify the host computer 210.

In this embodiment, the host identification module 501 of the host validation system 101 uses TPM remote attestation to identify the host computer 210 to which the portable storage device 301 has been coupled. As noted above, identifying credentials 311 of known host computers 210 are stored in a secure partition 309 of the portable storage device 301. A credentials verifying module 507 of the host validation system 101 compares the identifying secure binary measurement 505 of the host computer 210 to which the portable storage device 301 is coupled to the stored identifying credentials 311, to determine whether the currently coupled host computer 210 is known to the host validation system 101, and approved for accessing at least some data 303 stored on the portable storage device 301. In some embodiments, the stored identifying credentials 311, like the identifying secure binary measurement 505, identify not only a specific computer 210, but a trustworthy configuration of that computer 210. Thus, the stored identifying credentials 311 can identify trustworthy configurations of known host computers 210. By comparing the identifying secure binary measurement 505 of the host computer 210 to which the portable storage device 301 is coupled to the stored identifying credentials 311, the credentials verifying module 507 determines whether the current host 210 is known to the host validation system 101, and whether its configuration is trustworthy. If the host validation system 101 has stored identifying credentials 311 for the current host 210 but the current host 210 has been compromised, the credentials verifying module 507 detects this, because the current configuration for the host 210 is not a trustworthy one. What specific criteria are measured in a computer system 210 configuration can vary, but often includes low level system information such as the BIOS, the bootstrap loader, certain operating system settings, etc. What configuration is considered trustworthy for given host computers 210 is a variable design parameter. It is to be understood that the implementation mechanics of identifying the host computer 210 and determining whether it is known and trustworthy can vary from embodiment to embodiment. For example, although FIG. 5 illustrates using the host computer's TPM 503 for this purpose, in other embodiments a different, ubiquitous security device could be used.

Where the credentials verifying module 507 determines that the current host computer 210 is known and trustworthy, an access determining module 509 of the host validation system 101 determines what level of access (if any) to provide to the current host 210. To do so, the access determining module 509 can read the stored access policy 313. The stored access policy 313 indicates which levels of access (e.g., access to all data 303, access only to specific data 303, access limited by time and/or current geographic location, no access, etc.) to grant to specific, known host computers 210. It is to be understood that what specific access to allow to which specific host computers 210 is a variable design parameter. The access policy 313 can specify to provide or deny access to given host computers 210 at any level of granularity.

Where the credentials verifying module 507 determines that the current host computer 210 is not known, in some embodiments, the access determining module 509 simply prevents the host computer 210 from accessing the portable storage device 301. In other embodiments, the access policy 313 can specify that at least some unknown hosts 210 are to be granted at least some access under certain circumstances. For example, the access policy 313 could specify to allow even unknown hosts 210 access to specific data 303 (e.g., by file, directory, partition, etc.), or to take a current configuration measurement of the unknown host computer 210 and to allow or deny varying levels of access based upon the results.

It is to be understood that the implementation mechanics of the secure communication between the portable storage device 301 and the host computer 210 vary between embodiments. For example, the above description focuses on using the USB protocol because of the popularity of USB portable storage devices 301. However, as noted above, the functionality described herein can be implemented for other protocols in other embodiments, as the underlying methodology is protocol agnostic. The exact implementation mechanics to use to provide secure communication under a given protocol can also vary between embodiments, based on factors such the version of the protocol in use and design decisions made in the course of implementation.

In one USB based embodiment, commands can be transmitted between the portable storage device 301 and the host computer 210 by using USB control transfers. More specifically, upon the coupling of the portable storage device 301 to the host 210, the host 210 can confirm that the portable storage device 301 is capable of secure USB communication, for example by reading its USB vendor ID (not illustrated) or the like. In this embodiment, the host 210 transmits its identity to the portable storage device 301, which challenges with an anti-replay nonce (not illustrated) and requests the integrity-verified measurements (e.g., the TPM configuration data, as described above). The portable storage device 301 can receive attestations and measurements from the host 210 at a kernel level, that is, in the kernel of the operating system (e.g., Linux) running on the portable storage device 301. In the case of a Linux implementation, the sysfs mechanism can be used for moving these commands to user space of the memory 217 of the portable storage device 301. The host side functionality for this specific example of a secure USB communication implementation can be instantiated by modifying the conventional Linux file storage and gadget drivers 513 on the host 210, in order to provide the desired functionality, and running user-space daemons 515 on the host 210 for performing enforcement and logic operations. This example embodiment can be run in conjunction with any host computer 210 system with just the addition of the above-described kernel code and drivers 513. Under this embodiment, a host computer 210 without these modifications would be classified as unknown, and processed accordingly as described above. It is to be understood that these above-described low level implementation details are specific to an example embodiment. Other implementation mechanics can be applied to instantiate secure communication with and identification/verification of the host computer 210 from the portable storage device 301 in other embodiments.

Figure 6:
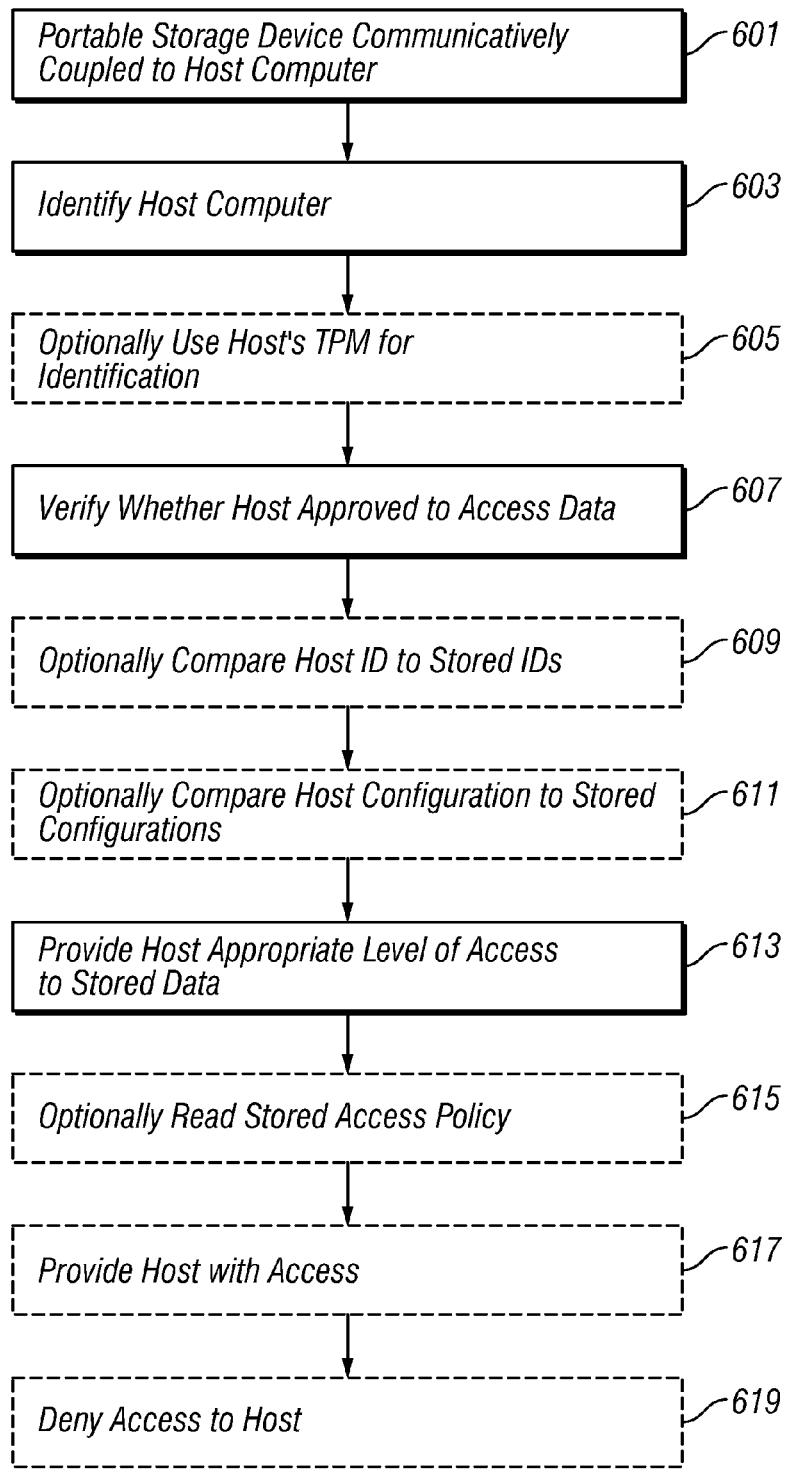
FIG. 6 is a flowchart illustrating steps for the operation of a host validation system, according to some embodiments.

FIG. 6 is a flowchart illustrating steps for the operation of a host validation system 101 (FIG. 1), according to some embodiments. As illustrated in FIG. 6, a portable storage device 301 (FIG. 3) containing a host validation system 101 (FIG. 1) is communicatively coupled 601 to a host computer 210 (FIG. 2). A host identifying module 501 (FIG. 5) of the host validation system 101 (FIG. 1) identifies 603 the host computer 210 (FIG. 2) to which the portable storage device 301 (FIG. 3) is communicatively coupled. In some embodiments, the host identifying module 501 (FIG. 5) uses 605 the host computer's TPM 503 (FIG. 5) to identify the host computer 210 (FIG. 2), for example by using remote attestation and identifying the current configuration of the host computer 210 (FIG. 2). A credentials verifying module 507 (FIG. 5) of the host validation system 101 (FIG. 1) verifies 607 whether the host computer 210 (FIG. 2) is approved to access data 303 (FIG. 3) stored on the portable storage device 301 (FIG. 3). To perform this verification, in some embodiments the credentials verifying module 507 (FIG. 5) compares 609 an identifier of the host computer 210 (FIG. 2) to a plurality of stored identifiers of host computers 210 (FIG. 2) approved for accessing data 303 (FIG. 3) stored on the portable storage device 301 (FIG. 3). In other embodiments, the credentials verifying module 507 (FIG. 5) can verify the host computer 210 (FIG. 2) by comparing 611 the identifier of the host computer 210 (FIG. 2) and its current configuration to a plurality of stored identifiers of host computer configurations approved for accessing data 303 (FIG. 3) stored on the portable storage device 301 (FIG. 3). An access determining module 509 (FIG. 5) of the host validation system 301 (FIG. 3) provides 613 the host computer 210 (FIG. 2) a level of access to data stored 303 (FIG. 3) on the portable storage device 301 (FIG. 3) based on the results of the above-described verification. To do so, the access determining module 509 (FIG. 5) can read 615 a stored access policy 313 (FIG. 3) which specifies a level of access to stored data 303 (FIG. 3) to be provided to the verified host computer 210 (FIG. 2), and provide 617 the host computer 210 (FIG. 2) with the specified level of access. Note that this can comprise the access determining module 509 (FIG. 5) denying 619 the host computer 210 (FIG. 2) access to data 303 (FIG. 3) stored on the portable storage device 301 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for validating a host computer from a portable storage device, the method comprising the steps of:
   detecting that the portable storage device is communicatively coupled to the host computer, the portable storage device comprising a secure partition with data, credentials and an access policy, and wherein the host computer is unable to access the data on the secure partition until authorized;
   the portable storage device interrogating a Trusted Platform Module (TPM) of the host computer to authorize the host computer, wherein the TPM comprises a secure crypto-processor chip, and wherein authorizing the host computer comprises:
      the portable storage device interrogating remote attestation of the TPM to identify a current configuration of the host computer and verify whether the host computer is approved for access based on the current configuration;
   the portable storage device verifying whether the host computer to which the portable storage device is communicatively coupled is approved for access based on the credentials in the secure partition;
   determining a level of access for the host computer based on the access policy in the secure partition; and
   providing the level of access to the host computer for data stored in the secure partition of the portable storage device responsive to the host computer authorization and access level determination.

2. The method of claim 1 wherein identifying, by the portable storage device, the host computer to which the portable storage device is communicatively coupled further comprises:
   using remote attestation, by the portable storage device, to identify the host computer.

3. The method of claim 1 wherein identifying, by the portable storage device, the host computer to which the portable storage device is communicatively coupled further comprises:
   identifying, by the portable storage device, a current configuration of the host computer.

4. The method of claim 1 wherein verifying, by the portable storage device, whether the host computer to which the portable storage device is communicatively coupled is approved to access data stored on the portable storage device further comprises:
   comparing, by the portable storage device, an identifier of the host computer to which the portable storage device is communicatively coupled to a plurality of stored identifiers of host computers approved for accessing data stored on the portable storage device.

5. The method of claim 1 wherein verifying, by the portable storage device, whether the host computer to which the portable storage device is communicatively coupled is approved to access data stored on the portable storage device further comprises:
   comparing, by the portable storage device, an identifier of the host computer to which the portable storage device is communicatively coupled and a current configuration of said host computer to a plurality of stored identifiers of host computer configurations approved for accessing data stored on the portable storage device.

6. The method of claim 1 wherein verifying, by the portable storage device, whether the host computer to which the portable storage device is communicatively coupled is approved to access data stored on the portable storage device further comprises:
   determining, by the portable storage device, that the host computer to which the portable storage device is communicatively coupled is not currently approved to access data stored on the portable storage device;
   determining, by the portable storage device, a current configuration of said host computer; and
   verifying, by the portable storage device, whether the host computer is approved to access data stored on the portable storage device in response to the current configuration of said host computer.

7. The method of claim 1 wherein providing to the host computer, by the portable storage device, a level of access to data stored on the portable storage device, the level of access being determined in response to the verifying step system further comprises:

reading, by the portable storage device, a stored access policy, specifying a level of access to data stored on the portable storage device to be provided to the verified host computer; and providing to the verified host computer, by the portable storage device, a level of access to data stored on the portable storage device as indicated by the access policy.

8. The method of claim 1 wherein providing to the host computer, by the portable storage device, a level of access to data stored on the portable storage device, the level of access being determined in response to the verifying step system further comprises:

denying the host computer, by the portable storage device, access to data stored on the portable storage device.

9. The method of claim 1 further comprising:

using, by the portable storage device, a Universal Serial Bus protocol to communicate with the host computer.

10. A portable storage device configured to validate host computers for accessing data stored on the portable storage device, the portable storage device comprising:

a processing unit;

computer memory;

an interface configured to communicatively couple the portable storage device to a computer system;

a host identifying module running in the computer memory of the portable storage device, to detect that the portable storage device is communicatively coupled to the host computer, the portable storage device comprising a secure partition with data, credentials and an access policy, and wherein the host computer is unable to access the data on the secure partition until authorized, the portable storage device to interrogate a Trusted Platform Module (TPM) of the host computer to authorize the host computer, wherein the TPM comprises a secure crypto-processor chip, the host identifying module interrogating remote attestation of the TPM to identify a current configuration of the host computer and verify whether the host computer is approved for access based on the current configuration;

a credentials verifying module running in the computer memory of the portable storage device, to verify whether the host computer to which the portable storage device is communicatively coupled is approved for access based on the credentials in the secure partition; and an access determining module running in the computer memory of the portable storage device, to determine a level of access for the host computer based on the access policy in the secure partition, and the level of access to the host computer for data stored in the secure partition the portable storage device responsive to the host computer authorization and access level determination.

11. The portable storage device of claim 10 wherein the host identifying module is further configured to:

use remote attestation to identify the host computer to which the portable storage device is communicatively coupled.

12. The portable storage device of claim 10 wherein the host identifying module is further configured to:

identify a current configuration of the host computer to which the portable storage device is communicatively coupled.

13. The portable storage device of claim 10 wherein the credentials verifying module is further configured to:

compare an identifier of the host computer to which the portable storage device is communicatively coupled to a plurality of stored identifiers of host computers approved for accessing data stored on the portable storage device.

14. The portable storage device of claim 10 wherein the credentials verifying module is further configured to:

compare an identifier of the host computer to which the portable storage device is communicatively coupled and a current configuration of said host computer to a plurality of stored identifiers of host computer configurations approved for accessing data stored on the portable storage device.

15. The portable storage device of claim 10 wherein the access determining module is further configured to:

provide the host computer at least some access to data stored on the portable storage device.

16. The portable storage device of claim 10 wherein the access determining module is further configured to:

deny the host computer access to data stored on the portable storage device.

17. At least one non-transitory computer readable storage medium storing a computer program product for validating a host computer from a portable storage device, the computer program product comprising program code for:

detecting that the portable storage device is communicatively coupled to the host computer, the portable storage device comprising a secure partition with data, credentials and an access policy, and wherein the host computer is unable to access the data on the secure partition until authorized;

the portable storage device interrogating a Trusted Platform Module (TPM) of the host computer to authorize the host computer, wherein the TPM comprises a secure crypto-processor chip, and wherein authorizing the host computer comprises;

the portable storage device interrogating remote attestation of the TPM to identify a current configuration of the host computer and verify whether the host computer is approved for access based on the current configuration;

the portable storage device verifying whether the host computer to which the portable storage device is communicatively coupled is approved for access based on the credentials in the secure partition;

determining a level of access for the host computer based on the access policy in the secure partition; and providing the level of access to the host computer for data stored in the secure partition of the portable storage device responsive to the host computer authorization and access level determination.

18. The computer program product of claim 17 wherein the program code for identifying, from the portable storage device, the host computer to which the portable storage device is communicatively coupled further comprises:

program code for identifying, from the portable storage device, a current configuration of the host computer.

* * * * *